United States Patent [19]

Suzuki

[11] Patent Number: 5,210,585
[45] Date of Patent: May 11, 1993

[54] RANGE FINDER HAVING A PLURALITY OF SIGNAL RECEPTION MEANS

[75] Inventor: Ryoichi Suzuki, Yokohama, Japan

[73] Assignee: Canon Kabushiki Kaisha, Tokyo, Japan

[21] Appl. No.: 692,199

[22] Filed: Apr. 26, 1991

[30] Foreign Application Priority Data

Apr. 26, 1990 [JP] Japan .................. 2-114600

[51] Int. Cl.⁵ .................. G01C 3/00; G01C 5/00; G03B 3/00
[52] U.S. Cl. ........................ 356/1; 354/403
[58] Field of Search .............. 356/1; 354/403

[56] References Cited

U.S. PATENT DOCUMENTS 3,443,502  5/1969  Harvey .................. 356/1
4,065,778  12/1977  Harvey ................. 354/403
4,655,586  4/1987  Stauffer ................ 356/1
4,943,824  7/1990  Nabeshima et al. ........ 354/403
5,060,003  10/1991  Kotani et al. ........... 354/403

Primary Examiner—Stephen C. Buczinski
Attorney, Agent, or Firm—Fitzpatrick, Cella, Harper & Scinto

[57] ABSTRACT

A range finder that measures a distance to an object by projecting a signal and receiving it back has a signal projection device for projecting a signal, a first reception device for receiving a reflected signal of the projected signal which is reflected in a range from a near distance to a far distance, and a second reception device for receiving a reflected signal of the projected signal which is reflected from distant objects, in which range finder the distance measurement accuracy is enhanced and no decrease in an overall distance measurement accuracy occurs.

23 Claims, 6 Drawing Sheets

FAR SIDE ← → NEAR SIDE

FAR SIDE ← → NEAR SIDE

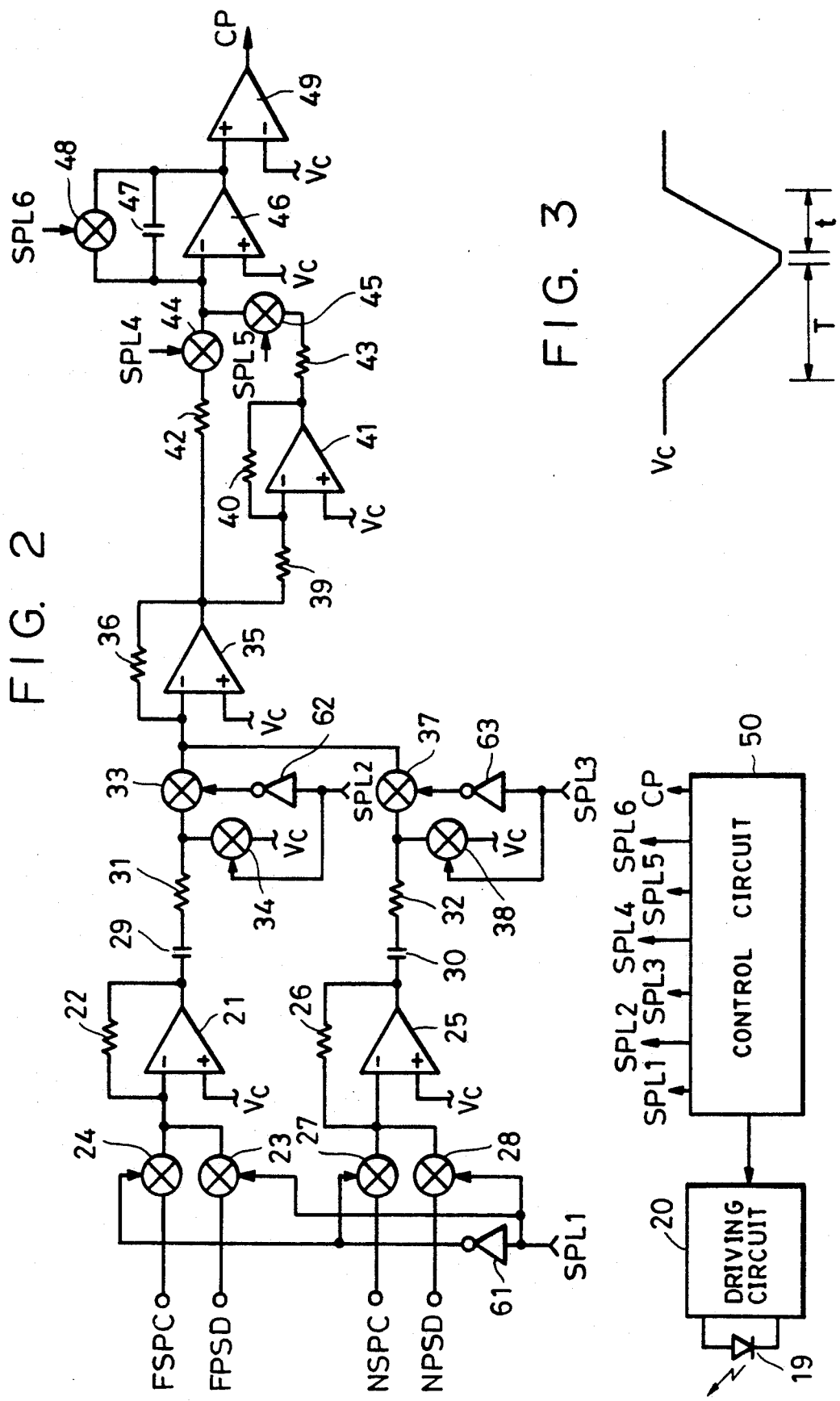

RANGE FINDER HAVING A PLURALITY OF SIGNAL RECEPTION MEANS

BACKGROUND OF THE INVENTION

1. Field of the Invention

The present invention relates to an active type range finder that measures a distance to an object by projecting a signal and receiving a reflected signal back.

2. Description of the Related Art

Active type range finders used in cameras and the like, which have employed the principle of triangulation, have been widely known in the art. In this method, the distance to an object is measured by projecting a light signal to the object and receiving the reflected signal.

In addition, in recent years, range finders of this type capable of measuring a distance without moving parts have also found increasing use. Such range finders use a semiconductor position sensing device (PSD), employed as a light receiving means, for receiving the above-mentioned reflected light.

Since this PSD outputs a signal corresponding to the "center-of-gravity" position of the received light spot, image uniformity of the projected light image is not required and a wide measuring range can be set. One of the drawbacks, however, is that resistance noise occurs because a PSD has a resistance layer. The S/N ratio deteriorates in the case of measuring the distance to a relatively far object because the quantity of reflected light decreases, lowering the distance measurement accuracy. A decrease in the distance measurement accuracy for distant objects has become quite a serious problem in recent years, particularly with the advent of cameras using zoom lenses which can take a photograph of a far object.

A method has been considered in which each one of a pair of silicon photocells (SPC) is used separately and the position at which the reflected light is received is detected by the ratio of their outputs. However, if an attempt is made to cover the whole range of measuring distances from near to far by this SPC pair, it is impossible to lengthen the base length of the range finder. This method is problematical because the overall distance measurement accuracy is decreased.

SUMMARY OF THE INVENTION

The present invention in one aspect pertains to a range finder that measures a distance to an object by projecting a signal and receiving a reflected signal back comprising signal projection means for projecting the signal, first signal reception means for receiving a reflected signal of the projected signal which is reflected from the object when the object is at a point in a range extending from a relatively near distance to a relatively far distance from the range finder, and second signal reception means for receiving a reflected signal of the projected signal which is reflected from the object when the object is located at a point which is at the relatively far distance.

The present invention in another aspect pertains to a range finder that measures a distance to an object by projecting a signal and receiving a reflected signal back comprising signal projection means for projecting the signal, first signal reception means for receiving a reflected signal of the projected signal which is reflected from the object when the object is at a point in a range extending from a relatively near distance to a relatively far distance from the range finder, second signal reception means for receiving a reflected signal of the projected signal which is reflected from the object when the object is located at a point which is at the relatively far distance, and calculation means for calculating the distance to the object as a function of at least one of the outputs of the first signal reception means and the second signal reception means.

BRIEF DESCRIPTION OF THE DRAWINGS

FIG. 2 is a circuit diagram showing an embodiment of an electrical circuit to effect the present invention which inputs the output of the photosenser;

FIG. 3 is an integration wave chart of the circuit of FIG. 2;

These and other objects, features and advantages of the present invention will become clear when reference is made to the following description of the preferred embodiments of the present invention, together with reference to the accompanying drawings.

DETAILED DESCRIPTION OF THE PREFERRED EMBODIMENTS

Various embodiments of the present invention will be explained hereinbelow in detail with reference to the accompanying drawings.

Figure 1A:
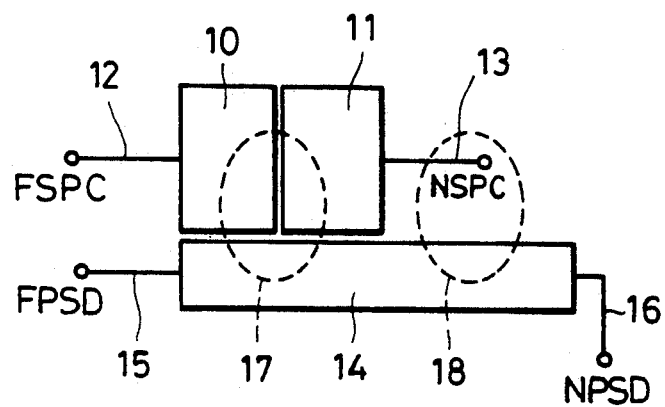
FIG. 1(a) shows a first embodiment of a type of photosenser to effect the present invention.
Figure 1B:
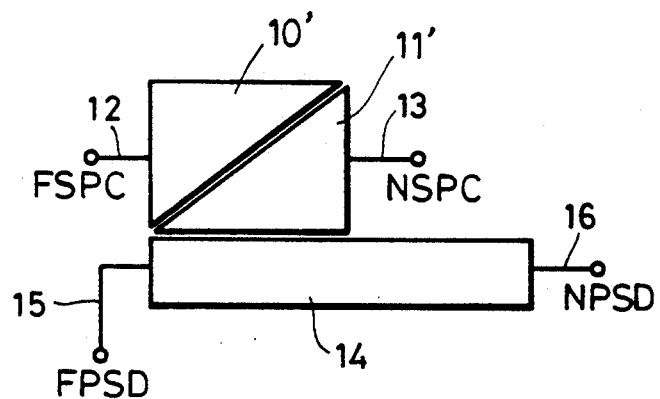
FIG. 1(b) shows a second embodiment of a type of photosenser to effect the present invention.

FIGS. 1(a) and 1(b) show the construction of a photosensor of the present invention employed as a light receiving means that receives the reflected light of a signal light in an active type range finder.

FIG. 1(a) shows a first embodiment of the photosensor. In FIG. 1(a), reference numerals 10 and 11 denote SPCs that form a pair of SPC sensors used as a second receiving means. Reference numerals 12 and 13 each denote an output lead line extending respectively from the SPCs 10 and 11. Reference numeral 14 denotes a PSD used as a first receiving means. Reference numerals 15 and 16 each denote an output lead line extending respectively from either side of the PSD 14.

Reference numeral 17 denotes a received light spot image in a case where a signal light projected from a light projection element (IRED) 19 (shown in FIGS. 2 and 5) is reflected at a relatively far distance side of the photosensor, and reference numeral 18 denotes a received light spot image in a case where a signal light also projected from the IRED 19 is reflected at a relatively near distance side of the photosensor. In the far distance side of the photosensor, the output current of the SPCs 10 and 11 caused by the received light spot image 17 is computed by an electrical circuit which will be described later, and distance measurement information is obtained. In the near distance side of the photosensor, a similar circuit computation is performed by using the output current from the PSD 14 caused by the received light spot image 18, and distance measurement information is obtained.

FIG. 1(b) shows a second embodiment of the photosenser. One difference between the second embodiment and the first embodiment is that, in the second embodiment, SPCs 10' and 11' are shaped in the form of a triangle. They are shaped this way to enlarge the range of measuring distances by means of the two SPCs 10' and 11'.

The above-mentioned SPCs and PSD may be formed on a single silicon chip or may be formed on different chips and assembled in a hybrid form. FSPCs and NSPCs in FIGS. 1(a) and 1(b) denote the output of a far distance side and a near distance side of a SPC, respectively. FPSDs and NPSDs in FIG. 1 denote the output of a far distance side and a near distance side of a PSD, respectively. FIG. 2 is a circuit diagram showing an embodiment of an electrical circuit which inputs the output of the photosenser of FIGS. 1(a) and 1(b). In FIG. 2, reference numeral 19 denotes an IRED employed as a signal projection means for projecting a signal light in a direction toward an object for measuring distance to the object in order to perform the above-mentioned active type distance measurement; 20 denotes a driving circuit for driving the IRED 19; 21 denotes an OP amplifier for amplifying a signal at the far distance side of both the PSD and SPC which form the photosensor; 22 denotes a negative feedback resistor of the OP amplifier; 23 and 24 each respectively denote an analog switch for respectively selecting a SPC output and a PSD output; 25 denotes an OP amplifier for amplifying a signal at the near distance side of both the PSD and SPC which form the photosensor; 26 denotes a negative feedback resistor of the OP amplifier; 27 and 28 each denote an analog switch for selecting either the SPC output or the PSD output; 29 and 30 each denote a capacitor which forms a high pass filter; 35 denotes an OP amplifier which forms an inversion amplifier; 31, 32, and 36 denote resistors which form an adder; 33, 34, 37 and 38 denote analog switches, and by turning on or off the same, a selection of either adding the signals of the far distance side and near distance side of the photosensor or amplifying only one of the signals is made; 41 denotes an OP amplifier which forms the inversion amplifier of amplification 1 together with resistors 39 and 40; 46 denotes an OP amplifier which forms an integrator; 47 denotes a capacitor disposed in the negative feedback line of the OP amplifier; 48 denotes an analog switch for resetting the capacitor 47; 42 and 43 each denote a resistor for determining an integration current; 45 and 46 each denote an analog switch which is turned on or off in synchronization with a flashing cycle of the IRED 19 in order to synchronously detect the reflected light of a signal light projected from the IRED 19; 49 denotes a comparator; 61, 62, and 63 each denote an inverter; and 50 denotes a control circuit comprised of a microcomputer for turning the above analog switches on or off, controlling the driving of the IRED 19, or performing distance measurement computation, and of other devices.

This circuit constructed as described above obtains distance measurement information by a well-known double integration operation. The method for obtaining distance measurement information by a double integration operation is publicly known and disclosed, for example, in U.S. Pat. No. 4,720,723. Thus, a detailed explanation thereof is omitted.

Figure 4:
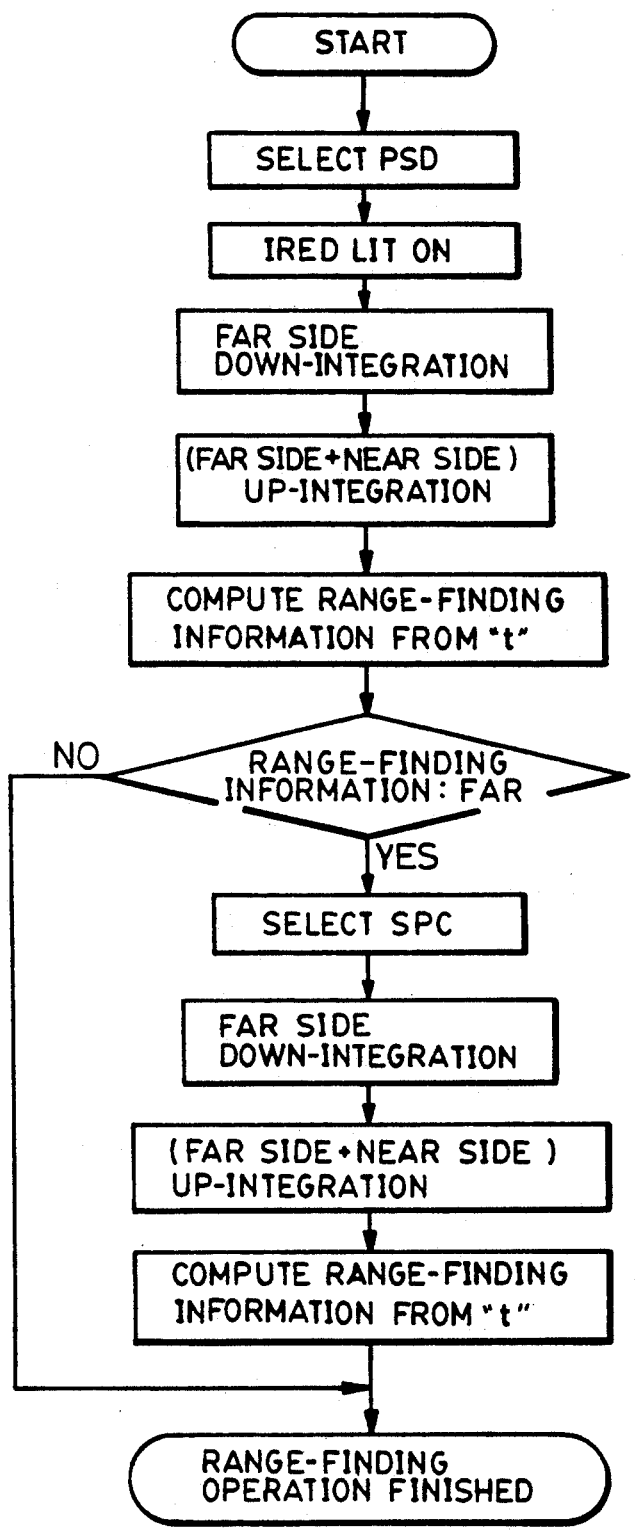
FIG. 4 is a flowchart showing the operation of the circuit of FIG. 2.

Next, the operation of the circuit of FIG. 2 will be explained with reference to the flowchart in FIG. 4, in which the operation of a control circuit 50 is shown.

The control circuit 50 turns on analog switches 23 and 28 in response to the first stroke of a shutter release button (not shown) and turns off analog switches 24 and 27 to select a PSD mode. In this state, a voltage corresponding to the output current of, respectively, the far distance side and near distance side of the PSD 14 of FIG. 1 develops at each respective output of the OP amplifiers 21 and 25. Next, a signal is sent to the driving circuit 20 from the control circuit 50, and the IRED 19 begins to flash. The control circuit 50 turns on analog switches 33 and 38 and turns off analog switches 34 and 37. Then, the electrical potential at the connection point between the resistor 32 and the analog switch 38 becomes $V_c$. Therefore, the output of the near distance side of the OP amplifier 25 is not added, and only the output of the far side of the OP amplifier 21 is amplified and output to the input of the OP amplifier 35. The output of amplifier 35, the inversion output of the OP amplifier 41, and the periodic detection action of analog switches 44 and 45 cause the integration capacitor 47 to be down-integrated for a fixed time period (T), as shown in FIG. 3. After the lapse of the time period T, analog switches 33 and 37 are turned on, and analog switches 34 and 38 are turned off. Both the output at the far distance side of the OP amplifier 21 and that at the near distance side of the OP amplifier 25 are added by the OP amplifier 35. The output of the OP amplifier 35 corresponds to a signal of (far+near). This output, the inversion output of the OP amplifier 41, and the periodic detection action of the analog switches 44 and 45 this time cause the integration capacitor 47 to be up-integrated for a fixed time period (t), as shown in FIG. 3. When this integration output reaches the $V_c$ level, the output CP of the comparator 49 is inverted to a high level, and the integration operation ends. The control circuit 50 computes object distance data by this up-integration time t.

Next, when it is determined that this distance data is a far distance, analog switches 24 and 27 are turned on, analog switches 23 and 28 are turned off, and the SPC mode is selected. The above-mentioned double integration operation is performed again in this mode to reproduce distance measurement data. When it is determined that the distance is a near distance, this distance measurement operation is not performed again.

In this embodiment, as described above, a distance measurement operation is first performed in the PSD mode. When the result indicates a far distance, a distance measurement operation is again performed in the SPC mode. Thus, distance measurement accuracy for a far distance is improved.

Next, a description will be given of another embodiment of the present invention.

In this embodiment, first, a SPC is selected and a distance measurement operation for a far distance side is performed. When an output current does not develop from this SPC, a PSD is selected and a distance measurement operation for a near distance side is performed.

Figure 5:
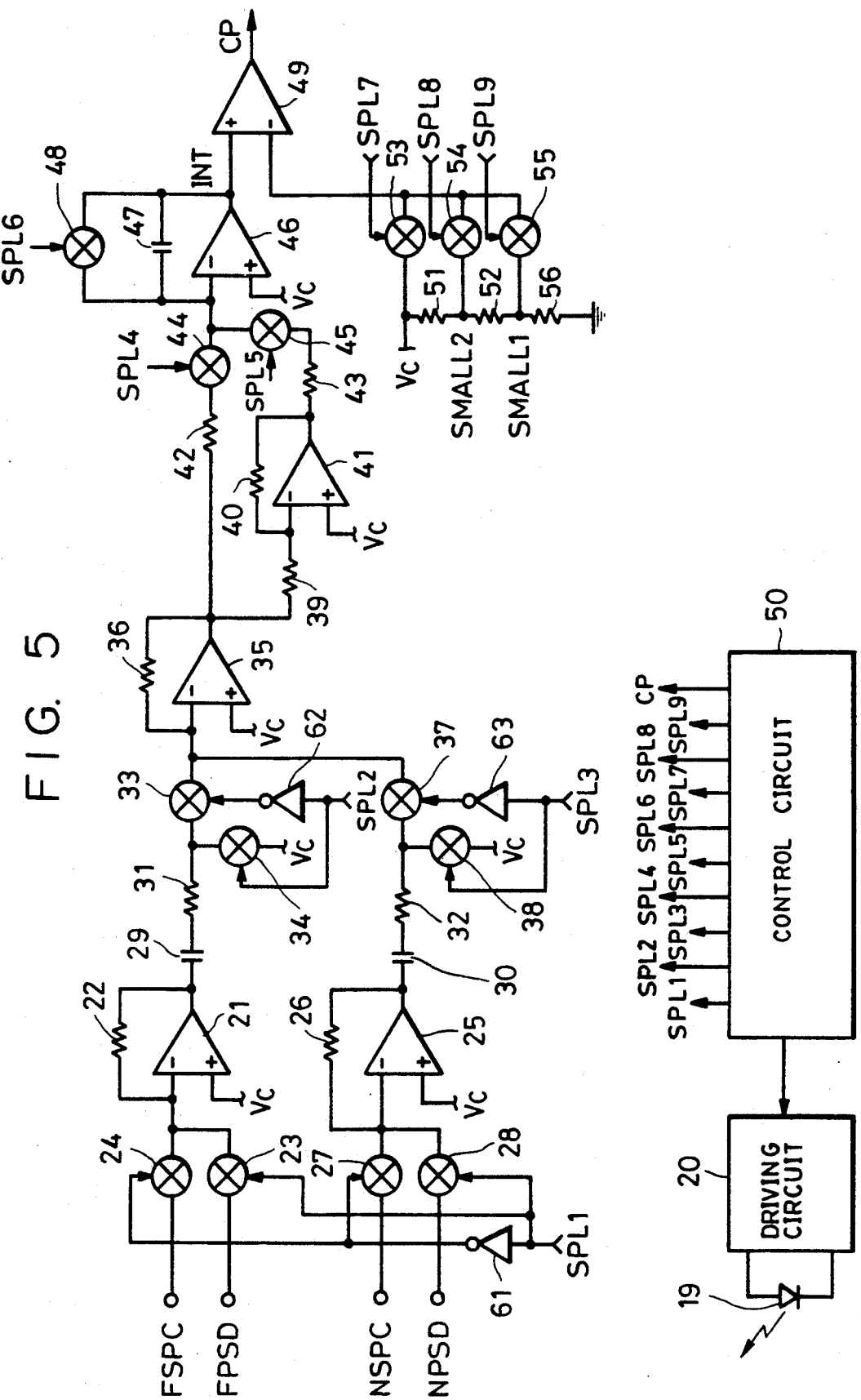
FIG. 5 is a circuit diagram showing an electrical circuit of another embodiment of the invention which inputs the output of the photosenser of FIG. 1.

FIG. 5 is a circuit diagram showing an electrical circuit of the present embodiment which inputs the output of the photosensor of FIG. 2. This circuit is almost the same as that of FIG. 2 except that resistors 51, 52 and 56, analog switches 53, 54, and 55 are added in order to produce SMALL 1 level and SMALL 2 level which will be described later. Those elements shown in FIG. 5 which are the same as those shown in FIG. 2 are given the same reference numerals, and thus an explanation thereof is omitted. At the time of determining the SMALL 1 level, the analog switch 55 is turned on, analog switches 53 and 54 are turned off, and the voltage level at the voltage divided point between the resistors 52 and 56 becomes a reference level for the comparator 49. At the time of determining the SMALL 2 level, the analog switch 54 is turned on, analog switches 53 and 54 are turned off, and the voltage level at the voltage divided point between the resistors 51 and 52 becomes a reference level for the comparator 49. When the analog switch 53 is on and the analog switches 54 and 55 are off, $V_c$ becomes a reference level which is used to determine the stoppage of the normal up integration.

Figure 6:
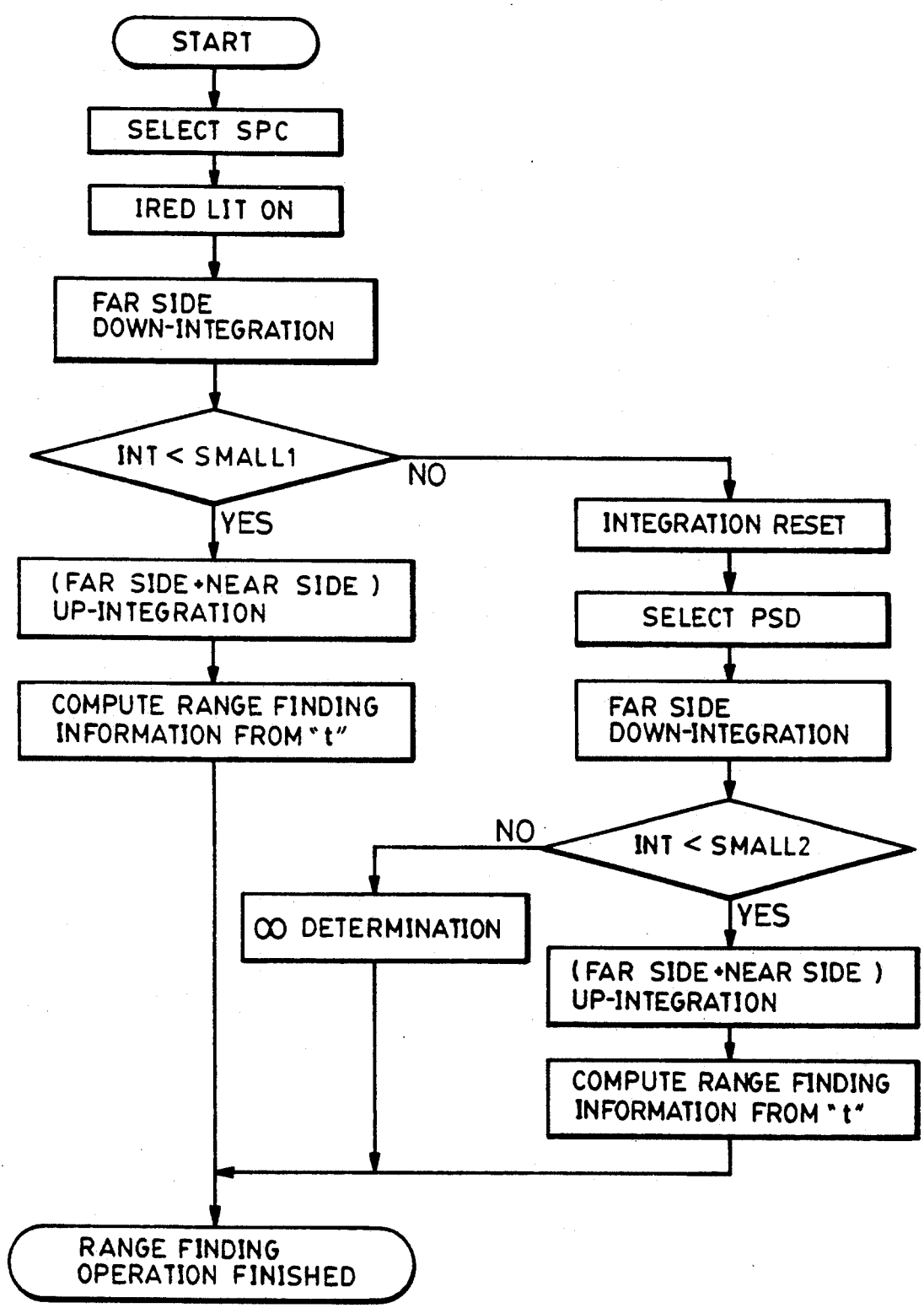
FIG. 6 is a flowchart showing the operation of the circuit of FIG. 5.

Next, the operation of the circuit of FIG. 5 will be explained with reference to the flowchart of FIG. 6. An SPC is selected by turning on the analog switches 24 and 27 and turning off the analog switches 23 and 28, causing the IRED 19 to blink. Next, a down-integration is performed for a fixed time period (T) by using a signal of the far distance side in the same manner as was explained in the embodiment shown in FIG. 2. When this integration level (INT) falls below the SMALL 1 level, it is assumed that the object is at the far distance side, and then an up-integration is performed by using a signal of (far+near sides) to compute distance measurement data from the time period t. On the other hand, when the down integration value of the far distance side does not reach the SMALL 1 level, this integration value is reset and a switching is made to a PSD. Then, a down-integration is performed for a time period T by using a signal of the far distance side of the PSD. When this integration level falls below the SMALL 2 level, it is assumed that the object is within a range in which the PSD can measure. Then, an up-integration is performed by using a signal of (far+near sides) to compute distance measurement data from the time period t. On the other hand, when the down-integration value of the far distance side does not reach the SMALL 2 level, it is regarded that no output signals are generated from SPC or PSD. Thus, distance measurement data is judged to be infinite.

Figure 7:
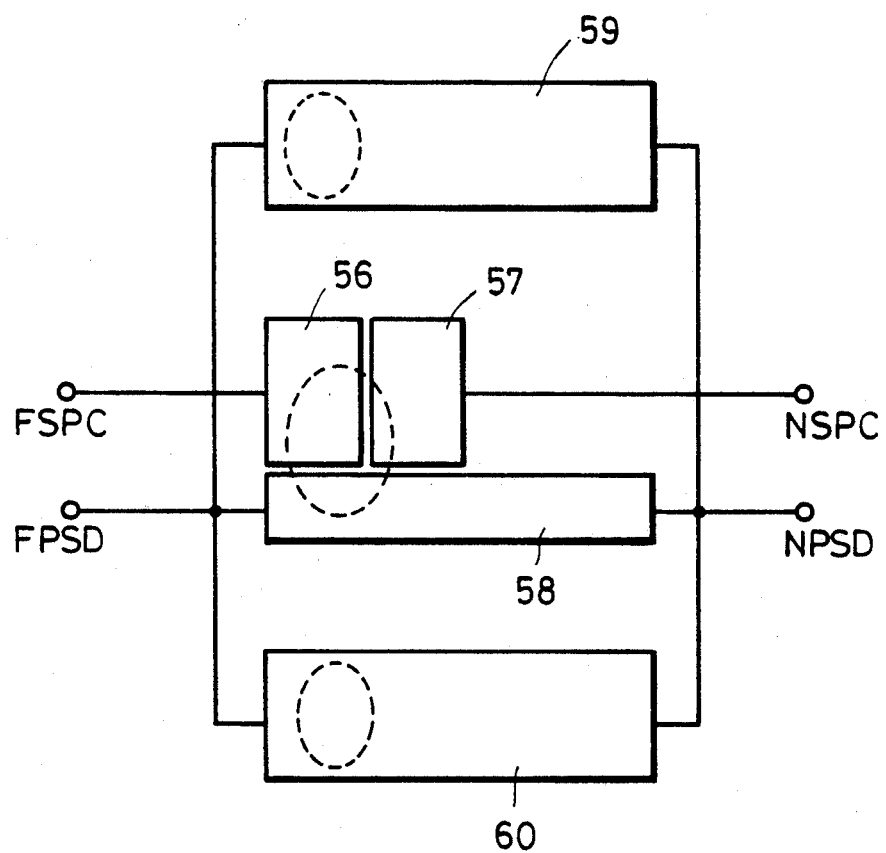
FIG. 7 shows a third embodiment of the photosensor to effect the present invention.

Next, a further embodiment of the present invention is shown in FIG. 7. FIG. 7 shows the construction of an active type photosensor for multipoint distance measurement. In FIG. 7, reference numerals 56 and 57 denote a SPC pair for a screen center portion distance measurement; 58 denotes a PSD pair for a screen center portion distance measurement; and 59 and 60 denote a PSD pair for the peripheral portions of both sides of screen distance measurement.

All the output terminals of the far distance side of the PSDs 58, 59, and 60 are connected commonly and output as a FPSD terminal. Also, all the output terminals of the near distance side thereof are connected commonly and output as a NPSD terminal. The output terminals of the far distance and near distance sides of the SPC pair 56 and 57 are output as a FSPC terminal and a NSPC terminal, respectively.

In this distance measurement method, distance measurement should be performed in the same manner as in the above-mentioned embodiment as follows: a signal light is first projected to the center portion of a screen, its reflected light is received by the SPC pair 56 and 57 for screen center portion distance measurement, and the PSD 58. Thereafter, the signal light is projected in sequence to the peripheral portion of both sides of the screen. Its reflected light is received by the PSDS 59 and 60 for the peripheral portion distance measurement so as to measure a distance in the same manner as in the above-mentioned embodiment.

For the above-mentioned light projection means for projecting signal light, triple IREDs may be used. The reason why no SPC is used in the peripheral portion distance measurement is that the distance measurement accuracy for the peripheral portion is not as crucial as for the center portion.

According to the embodiments described above, in a range finder that measures a distance to an object, distance measurement accuracy can be enhanced without causing a decrease in an overall distance measurement accuracy. The effectiveness of the range finder is quite high.

Many different embodiments of the present invention can be made without departing from the spirit and scope thereof; therefore, it is to be understood that this invention is not limited to the specific embodiments described above and is solely defined in the appended claims.

What is claimed is:

1. A range finder that measures a distance to an object by projecting a signal and receiving a reflected signal back comprising:

signal projection means for projecting said signal;

first signal reception means for receiving a reflected signal of the projected signal which is reflected from the object when the object is at a point in a range from a relatively near distance to a relatively far distance from said range finder; and second signal reception means for receiving only a reflected signal of the projected signal which is reflected from the object when the object is located at a point which is at the relatively far distance.

2. A range finder according to claim 1, wherein said first reception means includes a position sensing device.

3. A range finder according to claim 2, wherein said second reception means comprises a plurality of silicon photocells.

4. A range finder according to claim 3, wherein said silicon photocells are divided so that the ratio of their outputs varies in correspondence with the reception position of said signal on said photocells.

5. A range finder according to claim 1, further comprising:

detection means for detecting a distance to the object in response to said first signal reception means and said second signal reception means.

6. A range finder according to claim 5, wherein said detection means comprises determination means for determining the state of said first signal reception means and then determining the state of said second signal reception means.

7. A range finder according to claim 5, wherein said detection means comprises means for detecting a distance in response to said second signal reception means if the distance detected in response to said first signal reception means is a relatively far distance.

8. A range finder according to claim 7, wherein said detection means comprises means for switching off an output of said means for detecting a distance in response to said second signal reception means if the distance detected in response to said first signal reception means is a relatively near distance.

9. A range finder according to claim 7, wherein said detection means comprises means for switching off an output of said means for detecting a distance in response to said first signal reception means if the distance detected in response to said second signal reception means is a relatively far distance.

10. A range finder according to claim 5, wherein said detection means comprises means for switching off an output of said means for detecting a distance in response to said second signal reception means if the distance detected in response to said first signal reception means is a relatively near distance.

11. A range finder according to claim 5, wherein said detection means comprises determination means for determining the state of said second signal reception means and then determining the state of said first signal reception means.

12. A range finder according to claim 5, wherein said detection means comprises means for detecting a distance in response to said first signal reception means if the distance detected in response to said second signal reception means is a relatively near distance.

13. A range finder according to claim 5, wherein said detection means comprises means for switching off an output of said means for detecting a distance in response to said first signal reception means if the distance detected in response to said second signal reception means is a relatively far distance.

14. A range finder according to claim 5, wherein said detection means comprises means for judging a distance to said object to be optically infinite if neither the reception level of the reflected signal of said first signal reception means nor that of said second signal reception means does reach a predetermined level.

15. A range finder according to claim 5, wherein said detection means comprises means for detecting a distance to the object by a double integration process.

16. A range finder according to claim 5, further comprising a screen and wherein said detection means comprises means for detecting a distance in response to said first and second signal reception means with respect to the center of an image field and detecting a distance in response to said first signal reception means without using said second signal reception means with respect to a periphery of said image field.

17. A range finder according to claim 1, further wherein said second reception means comprises a plurality of triangular-shaped silicon photocells.

18. A range finder according to claim 1, further comprising:
calculation means for calculating the distance to the object as a function of at least one of the outputs of said first signal reception means and said second signal reception means.

19. A range finder that measures a distance to an object by projecting a signal and receiving a reflected signal back comprising:
signal projection means for projecting said signal;
first signal reception means for receiving a reflected signal of the projected signal which is reflected from the object when the object is at a point in a range extending from a relatively near distance to a relatively far distance from said range finder;
second signal reception means for receiving only a reflected signal of the projected signal which is reflected from the object when the object is located at a point which is at the relatively far distance; and
calculation means for calculating the distance to the object as a function of at least one of the outputs of said first signal reception means and said second signal reception means.

20. A range finder according to claim 19, wherein, when a distance based on the output from the first signal reception means cannot be properly calculated, said calculation means outputs the result of a calculation of a distance based on the output from the second signal reception means.

21. A range finder according to claim 19, wherein, when a distance based on the output from the first signal reception means can be calculated properly, said calculation means outputs said distance as the result of that calculation.

22. A range finder according to claim 19, wherein, when a distance based on the output from the second signal reception means cannot be properly calculated, said calculation means outputs the result of a calculation of a distance based on the output from the first signal reception means.

23. A range finder according to claim 19, wherein, when a distance based on the output from the second signal reception means can be calculated properly, said calculation means outputs said distance as the result of that calculation.

* * * * *

UNITED STATES PATENT AND TRADEMARK OFFICE
CERTIFICATE OF CORRECTION

PATENT NO. : 5,210,585
DATED : May 11, 1993
INVENTOR(S) : RYOICHI SUZUKI

It is certified that error appears in the above-indentified patent and that said Letters Patent is hereby corrected as shown below:

COLUMN 2
    Line 12, "photosenser" should read --photosensor--.
    Line 14, "photosenser" should read --photosensor--.
    Line 17, "photosenser;" should read --photosensor;--.
    Line 24, "photosenser" should read --photosensor--.

COLUMN 3
    Line 4, "enser." should read --ensor.--.
    Line 19, "photosenser" should read --photosensor--.

COLUMN 5
    Line 48, "photosenser" should read --photosensor--.

COLUMN 6
    Line 3, "PSDS 59" should read --PSDs 59--.

Signed and Sealed this

Eighth Day of March, 1994

Attest:

BRUCE LEHMAN

Attesting Officer    Commissioner of Patents and Trademarks